(12) United States Patent
Lin

(10) Patent No.: US 6,323,431 B1
(45) Date of Patent: Nov. 27, 2001

(54) CONNECTOR FOR A DECORATIVE LIGHT STRING HANGING ON AN OUTDOOR UMBRELLA

(76) Inventor: Fong-shi Lin, No. 196, Chin Long Road, Hsio Chin Ko Chang, Hwei Chou City, KaunTon (TW)

(*) Notice: Subject to any disclaimer, the term of this patent is extended or adjusted under 35 U.S.C. 154(b) by 0 days.

(21) Appl. No.: 09/496,583

(22) Filed: Feb. 2, 2000

(51) Int. Cl.[7] .................................................. H01B 7/06
(52) U.S. Cl. ........................ 174/135; 362/102; 174/68.3
(58) Field of Search .................................. 174/135, 155, 174/156, 44, 40 R, 45 TD, 70 A, 72 A, 72 C, 68.3; 362/102

(56) References Cited

U.S. PATENT DOCUMENTS

| | | | |
|---|---|---|---|
| 3,704,366 | * 11/1972 | Korb et al. | 240/10 T |
| 4,174,532 | * 11/1979 | Kelley | 362/102 |
| 5,094,893 | * 3/1992 | Snider | 428/18 |
| 5,193,566 | * 3/1993 | Chen | 135/28 |
| 5,273,464 | * 12/1993 | Rushing | 439/723 |
| 5,769,000 | * 6/1998 | Dunfey | 108/23 |

* cited by examiner

Primary Examiner—Dean A. Reichard
Assistant Examiner—W. David Walkenhorst
(74) Attorney, Agent, or Firm—Rosenberg, Klein & Lee

(57) ABSTRACT

This invention relates to a connector for a decorative light string hanging on an outdoor umbrella, which can be fixed on the umbrella shaft easily. The main electric wire and the end wires of the decorative light string are able to be leaded and connected from a plurality of grooves formed on the connector and able to be wound with a related rib of the umbrella frame and prevented from chaos of wound electric wires.

6 Claims, 4 Drawing Sheets

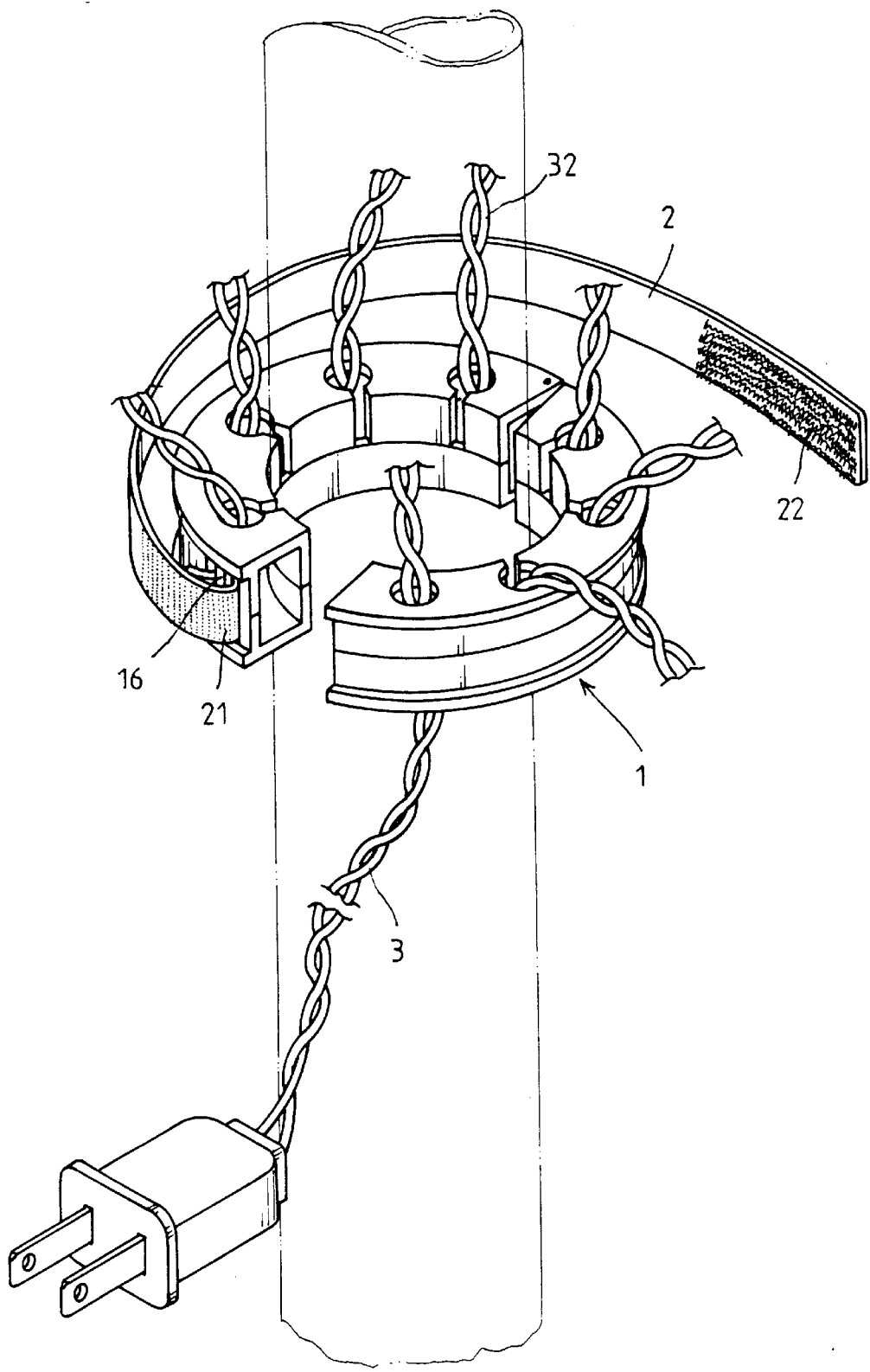
F I G. 3

CONNECTOR FOR A DECORATIVE LIGHT STRING HANGING ON AN OUTDOOR UMBRELLA

BACKGROUND OF THE INVENTION

In order to increase decorative effect at night, it is sometimes to hang a light string on the frame of an outdoor used umbrella having a larger size, wherein the light of the bulbs can show a lighting decoration. This known light string includes a main electric wire connecting with several end wires, which are connected with a related rib of the frame. The drawback of the prior design is that the end wires are usually winded together with each other and even the main wire to become chaos. The main wire can not be convenient to be regular with a shaft of the umbrella. It makes the use of the whole decorative set becoming difficult.

A main objective of the present invention is to provide a connector for a decorative light string, which can be hanged on an outdoor used umbrella by the use of the connector to fix the light string in regular on the umbrella very easy.

Now the structure and features of the present invention will be described in detailed with reference to the accompanying drawings.

BRIEF DESCRIPTION OF THE DRAWINGS

FIG. 3 is a partly assembled view of FIG. 2.

DETAILED DESCRIPTION OF THE PREFERRED EMBODIMENTS

Figure 1:
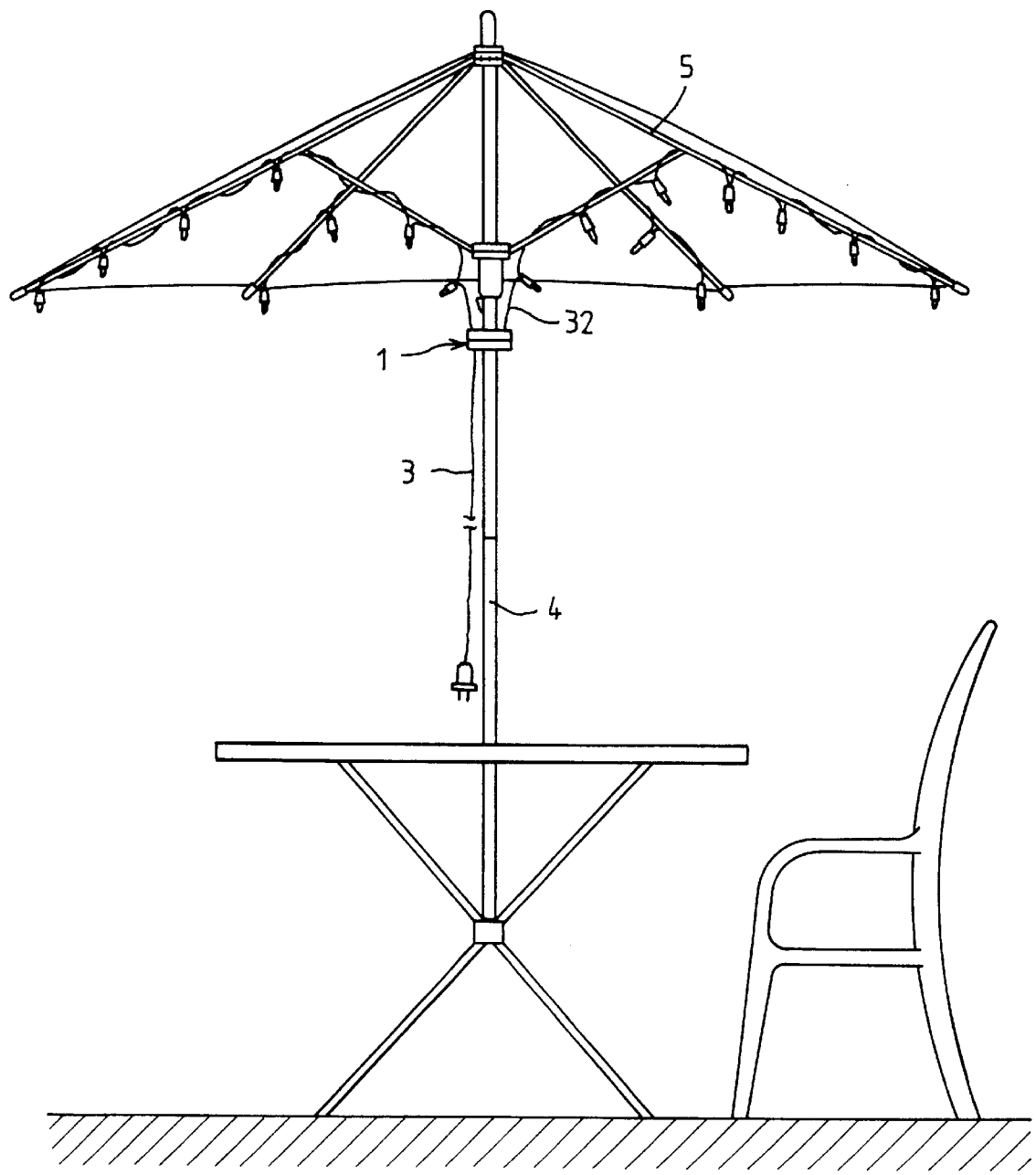
FIG. 1 is a plan view of an exemplary embodiment of an outdoor used umbrella with a connector accompanying with a decorative string according to the present invention.

Referring to FIG. 1, the present invention relates to an outdoors used umbrella which is provided with a decorative light string having a main electric wire (3) with several extended end wires (32) connected with related ribs (5) of the frame for a decorative purpose. The general purpose of the present invention is to provide a connector (1) to connect the main wire (3) and the end wires (32) effectively and to fix the wires neatly and conveniently on the umbrella shaft (4).

Figure 2:
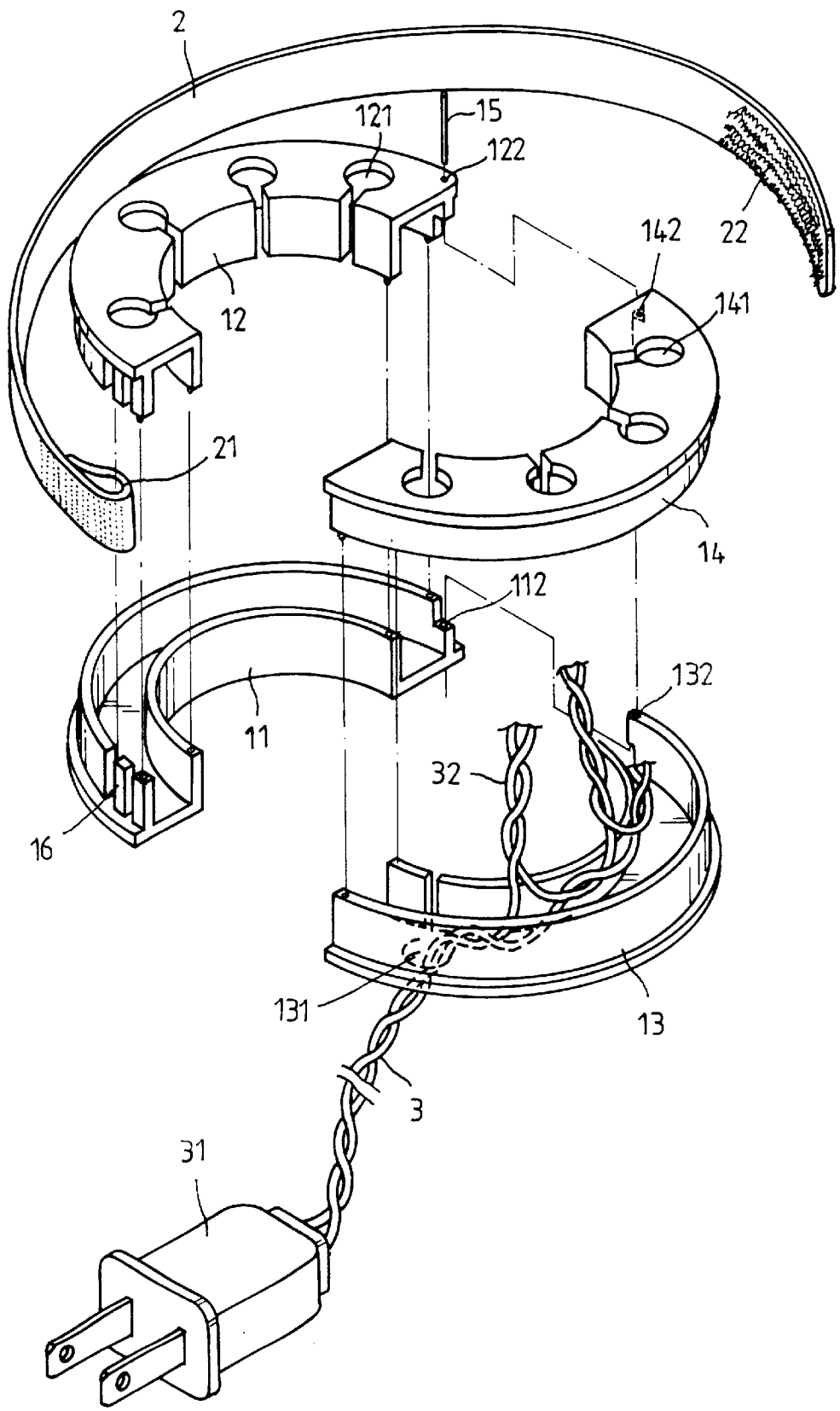
FIG. 2 shows an exploded perspective view of the connector and the electric wires of the light string according to the present invention.
Figure 4:
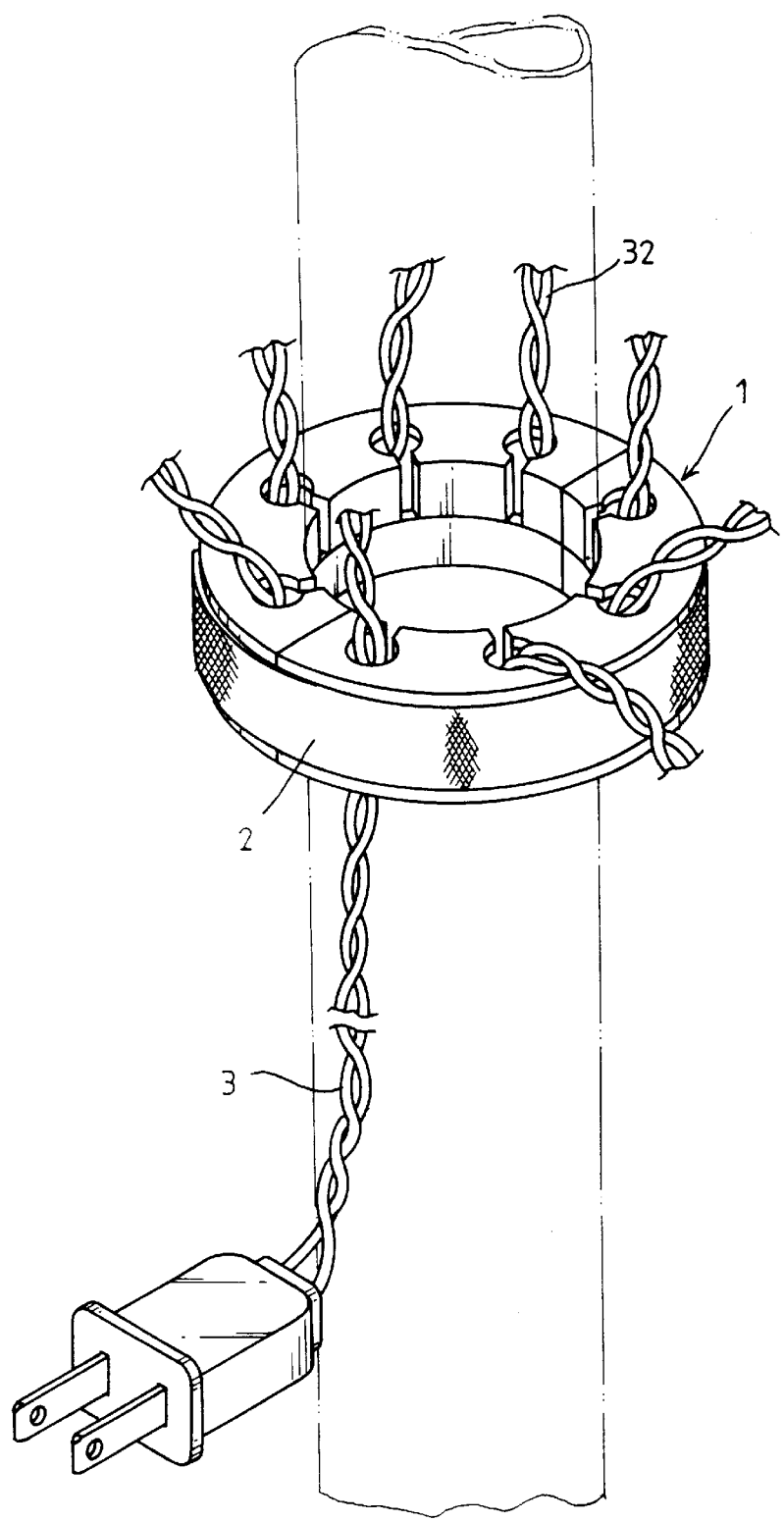
FIG. 4 is an assembled view of FIG. 3.

Please refer to FIGS. 2 to 4, the connector (1) is composed of a left lower semi-ring piece (11), a left upper piece (12), a right lower semi-ring piece (13), and a right upper piece (14). (The description of left or right in here is just for distinguishing and is without any limitation.) The assembled connector (1) becomes a ring configuration with a hollow channel therein. There are a plurality of connecting groove (121), (141) are formed on the upper pieces (12), (14). The same terminals of the four pieces are provided with a set of longitude holes (112), (122), (132), (142) for receiving a stick (15) to obtain a pivoted connection between them. The free ends of the left upper piece (12) and the left lower piece (11) are provided with a related rod to become a beam (16) after assembly, which is provided for fixing a loop end (21) of a magic belt (2). The magic belt (2) is capable of winding around the connector (1) and having the inner magic surface (22) adhered to itself in order to fix the connector (1) on the umbrella shaft (4) in secure.

In use, the main electric wire (3) is passed through a hole (131) formed at a bottom side of the right lower piece (13) into the hollow channel of the ring connector (1). Each end wire (32) is extended outside from a related connecting groove (121) or (141) to be winded with the rib of the umbrella for a decorative effect.

From the above design, the connector of the present invention can obviously lead and connect the main wire and the end wires of the decorative light string in regular and it can be easily fixed on the umbrella shaft by the magic belt. This reaches the main objective of the present invention and obtains a patent utility.

What is claimed is:

1. A connector for retaining at least a portion of a light string about a longitudinally directed umbrella shaft comprising:

(a) an assembly formed by a plurality of arcuate portions collectively encircling a portion of the umbrella shaft;
    a first of said arcuate portions including at least one first upper arcuate piece and at least one first lower arcuate piece, said first upper and lower arcuate pieces being coaxially disposed one over the other to define a first channel therebetween for receiving a portion of the light string;
    a second of said arcuate portions pivotally coupled to said first arcuate portion about a stick member, said second arcuate portion including at least one second upper arcuate piece and at least one second lower arcuate piece, said second upper and lower arcuate pieces being coaxially disposed one over the other to define therebetween a second channel communicating with said first channel for receiving a portion of the light string;
    at least one of said first upper and lower arcuate pieces and at least one of said second upper and lower arcuate pieces having formed therein a plurality of openings communicating with one of said first and second channels; and, (b) a belt member disposed about said assembly to releasably secure together said arcuate portions.

2. The connector as recited in claim 1 wherein said assembly is annular in contour.

3. The connector as recited in claim 2 wherein each of said first and second upper arcuate pieces is formed with said openings formed in an upper surface thereof, said openings defining a plurality of connecting grooves communicating with said one of said first and second channels.

4. The connector as recited in claim 3 wherein one of said first and second lower arcuate pieces includes a hole formed through a bottom surface thereof.

5. The connector as recited in claim 1 wherein each of said upper and lower arcuate pieces of said first and second arcuate portions includes a first end defining a longitudinal hole passing therethrough engaging said stick member, said longitudinal holes of said upper and lower arcuate pieces of both said first and second arcuate portions being aligned.

6. The connector as recited in claim 5 wherein said upper and lower arcuate pieces of at least one of said first and second arcuate portions define a longitudinally extended beam engaging said belt member.

* * * * *